Jan. 15, 1924.
A. L. PRIMEAU
1,480,782
PRESSURE COOKER
Filed Aug. 4, 1921
2 Sheets-Sheet 1
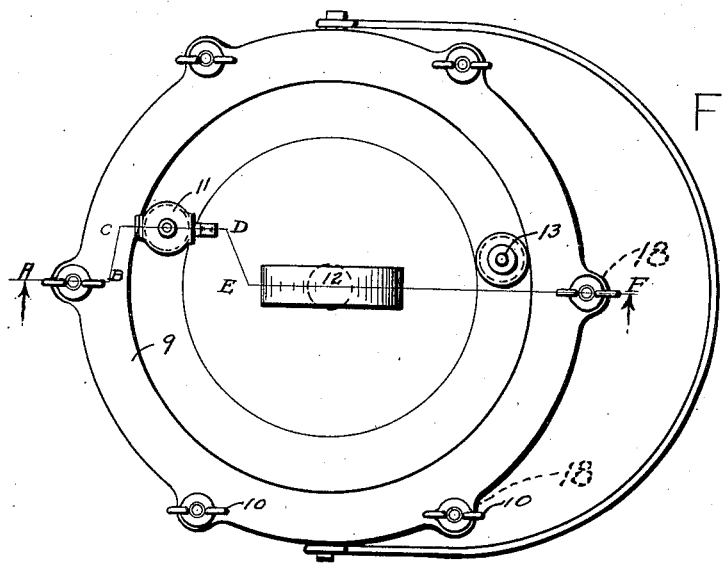
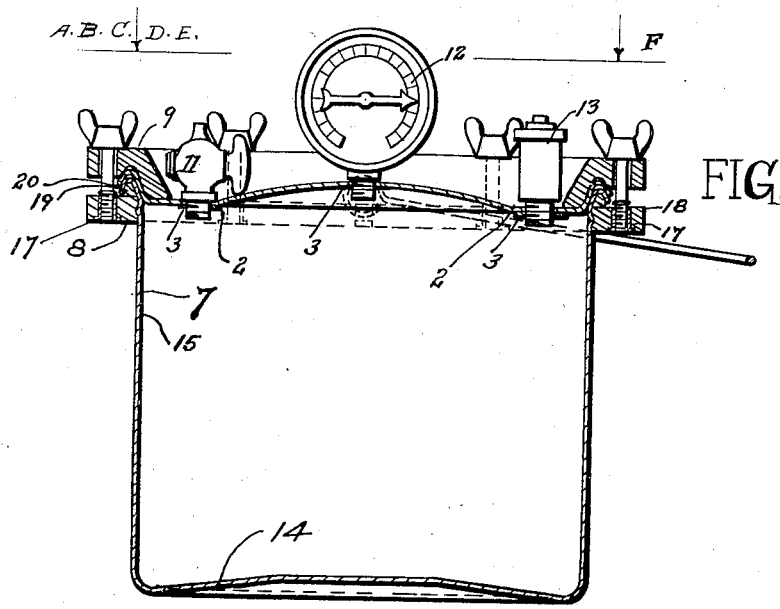
INVENTOR
Arthur L. Primeau,
BY
Edwin A. Packard
HIS ATTORNEY.

Jan. 15, 1924.
A. L. PRIMEAU
PRESSURE COOKER
Filed Aug. 4, 1921
1,480,782
2 Sheets-Sheet 2
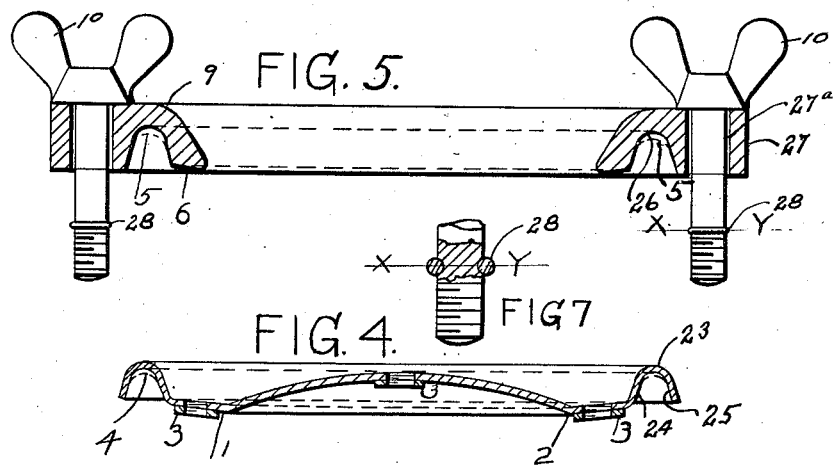
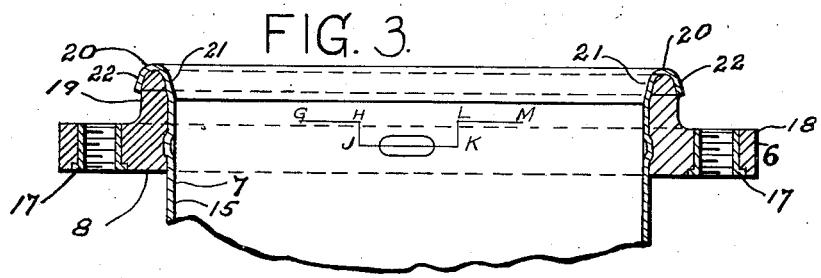
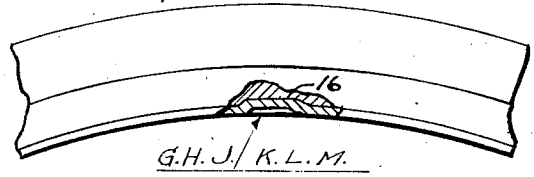

Patented Jan. 15, 1924.

1,480,782

UNITED STATES PATENT OFFICE.

ARTHUR L. PRIMEAU, OF CAMBRIDGE, MASSACHUSETTS.

PRESSURE COOKER.

Application filed August 4, 1921. Serial No. 489,738.

*To all whom it may concern:*

Be it known that I, ARTHUR L. PRIMEAU, a citizen of the United States, and a resident of Cambridge, in the county of Middlesex and State of Massachusetts, have made certain new and useful Improvements in Pressure Cookers, of which the following is a specification.

The invention relates to pressure-cookers principally employed in the cooking or preparing of foods, and a main object of the invention is to provide a construction which is strong but light in weight, which is easy to handle and to clean, which is cheap to manufacture, and which is efficient and practical in use.

The cooker has a kettle or body member and a cover; also preferably attachments, such as pressure gauge, blow-off or relief valve and pet cock. The present invention relates to such a cooker and is concerned with the forming of the kettle and cover, each of sheet metal, and the extending of the peripheral edges of the kettle and cover into a space between a specially constructed resisting ring with a resisting ledge thereupon on the one hand and a grooved portion of a clamping ring on the other hand whereby a tight joint is effected between and by a double seat portion provided by the sheet metal of the kettle and above the resisting ledge and a double seat portion provided by the sheet metal of the cover and below or in the grooved portion of the clamping ring.

The invention also relates to other features of construction, all of which are hereinafter set forth and fully described.

As showing a specific embodiment of the invention reference is made to the accompanying drawings forming a part of this specification, in which drawings, Figure 1 is a plan view of my pressure-cooker.

Figure 2 is a vertical sectional view of the kettle of Figure 1 and is a view taken as on the planes indicated by the broken lines A B C D E F of Figure 1 looking in the direction of the arrows shown in Figure 1.

Figure 3 is a partial sectional view showing the construction of the resisting ring with resisting ledge, which in cross-section is in the form of a modified inverted V approaching in contour the shape of a hyperbola over which the upper peripheral edge of the sheet metal of the kettle or body member of the cooker extends and is bent to form concentric inner and outer upwardly converging double seats. Figure 3 in conjunction with Figure 6 shows how the resisting ring is secured in place at the upper portion of the kettle.

Figure 4 is a vertical sectional view of the cover.

Figure 5 is a vertical sectional view of the clamping ring that engages the top of the cover. In Figure 5 there are also shown thumb screws which provide the means for drawing and holding the clamping ring in place.

Figure 6 is a horizontal view with a part in section, the section being taken as on the planes indicated by the broken lines G H J K L and M of Figure 3; and Figure 7 is a detail of the lower end of the thumb screws such as appear in Figure 5.

Reference will now be made to the drawings in detail. The cooker comprises the cover 1 which is seated upon the kettle or body member 7. The cover is secured in place on the kettle by clamping means comprising a bottom or resisting ring 8, a top or clamping ring 9 and clamping thumb screws 10. The cover may carry any attachment desirable for use with apparatus of the type herein involved; attachments, for example, as pet cock 11, pressure gauge 12 and blow-off or relief valve 13. The cover is reinforced at the places where the attachments are applied, as by means of small rings or collars 3 which are brazed, welded, soldered or otherwise secured in place in a manner to effectively increase the thickness of the cover. The under surface of the cover slopes downwardly and inwardly to the circular line 2, while the central portion of the cover is dome like, concave. This construction adds to the stiffness of the cover and provides a means for the dripping of the juices from the contents or food back to the food.

The kettle or body member has a bottom 14 made as a truncated cone, and an upstanding peripheral wall 15. The truncated formation adds somewhat to the heating surface, also stiffening the bottom and at the same time affording a lodging space for the condensed steam and any dripping seepage from the food. It will here be remarked that in the employment of a cooker of this type the food may be placed upon a false bottom put in the cooker at the time of inserting the food, in order to prevent the food from having direct contact with the high temperature of the metal bottom which is directly over the heating flame.

The lower ring or resisting ring 8 is located at the uppermost portion of the kettle or body member and is cut out or recessed at 16 and the thin metal of the upstanding walls is struck or bent into the recesses whereby the resisting ring is maintained in place on the kettle or body member. The resisting ring may be made of any suitable material in any suitable manner. It is, however, preferably made by the casting of material such as iron, aluminum or brass. In order to prevent excessive wear a nut member or threaded bushing, as 17, may be provided to receive the threaded ends of the thumb screws 10. The threaded bushings 17 may be of any suitable material, as machine steel. In order that the resisting ring may be relatively light in weight it is made with ears 18 where the bushings are located (see Figures 1 and 2).

Each ring 8 has its upper surface an upwardly extending annular reinforcing ridge 19 which in cross-section is in the form of a modified inverted V approaching in contour the shape of a hyperbola and the metal at 20, about the upper edge of the peripheral wall of the kettle or body member, is bent or rolled over and fits the reinforcing ridge or ledge whereby there are provided at the top of the kettle or body member 7 concentric inner and outer seat portions 21 and 22 which upwardly converge and have the same general contour as the reinforcing ledge. The peripheral portion 23 of the cover is provided on its under surface with concentric inner and outer seat portions 24 and 25 designed to respectively cooperate with the corresponding seat portions 21 and 22 of the kettle or body member. The uppermost position of the metal of the kettle is indicated by the dotted line at 4 (see Figure 4) whereby there exists a clearance which will permit a tight joint to be effected between the metal of the cover and the kettle that provides the inner and outer seat portions on each. The clamping ring 9 has an annular grooved portion 26 into which extends the metal of the cover that has been bent to provide the concentric seats 24 and 25 that are on the under side of the cover. The uppermost position of the metal of the cover is indicated by the dotted line 5 whereby a clearance is provided at the top between the metal at 23 and the metal defining the uppermost portion of the groove.

The resisting ring has ears 27 with openings 27ª through which the thumb screws 10 extend for the purpose of drawing the clamping ring in place and for holding it in place. The openings through which the thumb screws pass are larger than the screw rods in order to permit of the adjustment of the seats of the cover in proper place on the seats of the kettle. The clamping ring 9 is preferably made so that the innermost portion 6 thereof is in engagement with the upper surface of the cover when the clamping ring is functioning. The clamping or thumb screws 10 are each provided with a shoulder member, as 28, to retain the screws in clamping ring when the screws are not performing the function of securing the clamping ring in place.

From what has preceded it will be noted that the metal at the periphery of the kettle and the metal at the periphery of the cover extends into the space defined on the one hand by the resisting ledge of the resisting ring and on the other hand by the grooved portion of the clamping ring. It will also be clear from what has preceded that a tight joint is provided between the kettle and the cover by the double seat construction which includes the inner and outer concentric seats 21 and 22 of the kettle or body member and the inner and outer concentric seats 24 and 25 of the cover. As previously pointed out the inner and outer seats of each set converge upwardly with the result that the tighter the clamping by the clamping ring the tighter or more effective the joint. The clearance space above the line 4 of Figure 4 and above the line 5 in Figure 5 ensures the attainment of the desired end.

It will be manifest that the invention may be realized in various manners and forms and still remain within the purview and scope of the invention as expressed in the claims.

What I claim is—

1. A pressure-cooker comprising a sheet metal body member with a bottom and upstanding peripheral wall, and a sheet metal cover, which cooker is characterized by having on the body member a reinforcing ring with an annular upstanding resisting ledge which in cross-section is in the form of a modified inverted V approaching in contour the shape of a hyperbola and over which ledge the upper edge portion of the body is rolled and fitted to provide concentric inner and outer seat portions that upwardly converge, and by having on the cover a clamping ring with an annular grooved under side, which grooved portion in cross-section is in the form of a modified inverted V corresponding in general to the shape of the resisting ledge, the cover being shaped so that it has a bent portion that is located in and engaged by the sides of said grooved portion of the clamping ring when the latter is functioning, the grooved portion of the clamping ring and the bent portion of the cover being shaped so that there are provided on the under side of the cover a grooved portion having concentric inner and outer seat portions that upwardly converge and that rest upon the inner and outer seat portions of the body member but so that a clearance space is provided between the metal at the uppermost portion of the body member and the under side of the uppermost portion of the cover whereby when the clamping ring is in clamping position and pressing towards the resisting ring, a tight joint is effected between the concentric inner and outer converging seat portions of the body member on the one hand, and the concentric inner and outer converging seat portions of the cover, on the other hand, said cooker having means for pressing the clamping ring towards the resisting ring and for holding said rings in clamping position.

2. A pressure-cooker comprising a sheet metal kettle, a sheet metal cover, a resisting ring on the body with a ledge over which the metal of the upper edge of the kettle is bent in a manner to form concentric inner and outer upwardly converging seat portions, a top or clamping ring with a grooved underside into which is fitted a portion of the sheet metal cover which is bent to provide on the under side of the cover a grooved portion having concentric inner and outer upwardly converging seat portions which respectively cooperate with and fit the corresponding seat portions of the kettle to provide tight joints between the cooperating seat portions and means for drawing said rings towards each other and for holding them in a position whereby the seat portions of the kettle and the cover are clamped between the resisting ledge and the grooved portion of the ring, the construction being such that there is clearance between the uppermost edge of the kettle and the grooved under portion of the cover, whereby tight joints between the cooperating seat portions can be established and maintained.

3. A pressure cooker comprising a sheet metal kettle having its upper marginal edge constructed in the form of an inverted V in cross section to produce inner and outer diverging seat portions, a resisting ring secured to the kettle and having a ridge member fitted into said V portion and in close engagement with the metal to form a support for the seat portions, a sheet metal cover having a V-shaped rib adjacent its periphery producing a modified V-shaped groove on the under side thereof and providing seat portions adapted to wedgingly engage the seat portions of the upper marginal edge of the kettle and having a clearance at its apex, an integral clamping ring having a groove to receive and fit the rib on the cover, and means detachably connecting the clamping and resisting rings.

4. A kettle with a peripheral ridge which in cross section is an inverted V, a sheet metal cover having a corresponding grooved portion which in cross section is a modified inverted V, constructed so that when the cover is clamped in place there is clearance between the apices of the ridge and groove respectively whereby tight peripheral joints are effected by the material defining the sides of the inverted V ridge, on the one hand, and the sides of the inverted V grooved portion on the other hand, clamping means comprising a resisting ring and a clamping ring for clamping the cover in position on the kettle and mounted respectively on the kettle and cover and separated one from the other, and means acting to relatively approach the rings.

This specification signed this 2 day of August 1921.

ARTHUR L. PRIMEAU.